June 8, 1965 D. K. GRIMM 3,188,495
A.C. DETECTOR CIRCUIT
Filed April 8, 1963

INVENTOR.
DONALD K. GRIMM
BY Moody and Harris
ATTORNEYS 3,188,495
Patented June 8, 1965

3,188,495
A.C. DETECTOR CIRCUIT

Donald K. Grimm, Fargo, N. Dak., assignor to Collins Radio Company, Cedar Rapids, Iowa, a corporation of Iowa Filed Apr. 8, 1963, Ser. No. 271,198
4 Claims. (Cl. 307—88.5)

This invention relates to a detector circuit and more particularly to a circuit well suited for converting small A.-C. input signals to direct current output signals.

It is oftentimes desirable to provide means to detect small A.-C. signals. This is particularly true, for example, where the signals to be detected are pulses such as may be produced from a magnetic memory core device.

It is therefore an object of this invention to provide an improved detector capable of detecting small A.-C. signals.

More particularly, it is an object of this invention to provide a detector circuit that includes a pair of transistors and a capacitor, said capacitor being charged through one transistor and discharged through the other transistor whenever an A.-C. input signal is received to thereby develop a direct current signal across a load resistance.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiments of the herein disclosed invention may be included as come within the scope of the claims.

The accompanying drawings illustrate three complete examples of the embodiments of the invention constructed according to the best mode so far devised for the practical application of the principles thereof, and in which.

Figure 1:
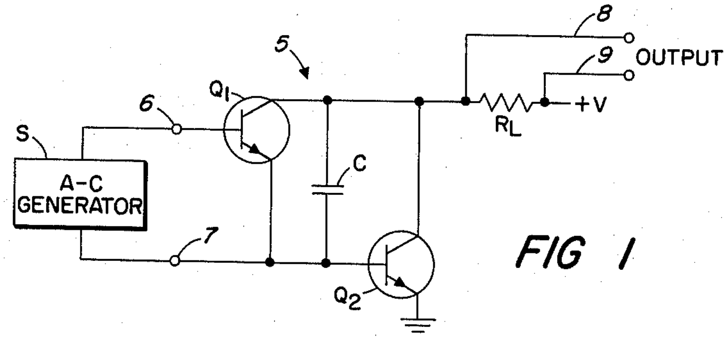
FIGURE 1 is a schematic presentation of a first embodiment of the detector circuit of this invention wherein the output load resistance is connected to the collector of the second transistor.

Referring now to the accompanying drawings in which like numerals have been used for like characters throughout, the numeral 5 refers generally to the detector circuit of this invention. As shown in the drawings, detector circuit 5 has a pair of input terminals 6 and 7 connected to A.-C. generator S, which generator may be a pulse generator as indicated in FIGURES 2 and 3, and could, for example, be a magnetic memory transformer.

Figure 3:
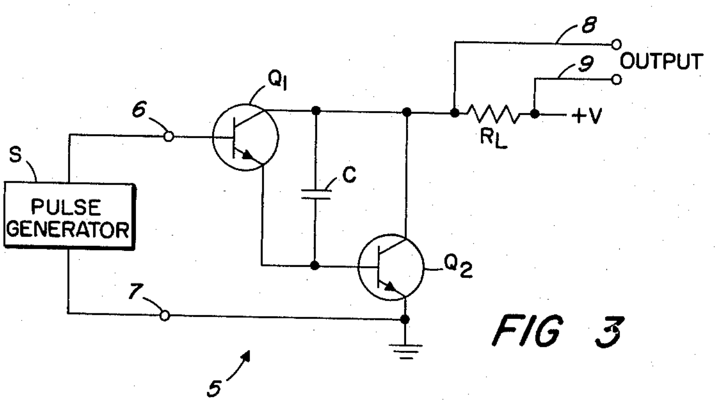
FIGURE 3 is a schematic presentation of a third embodiment of the detector circuit of this invention wherein the pulse generator is returned to ground rather than to emitter of the first transistor.

Input terminal 6 of detector circuit 5 is connected to the base of transistor $Q_1$, while input terminal 7 is connected to the emitter of transistor $Q_1$ (except for the FIGURE 3 embodiment in which this input terminal is grounded). In addition, a capacitor C is connected in shunt with transistor $Q_1$, having one end connected to the collector and the other end connected to the emitter of said transistor. Filter capacitor C may be smaller than the filter capacitor of a conventional rectifier.

A second transistor $Q_2$ has its base connected to the junction of capacitor C and the emitter of transistor $Q_1$, and its collector connected to the junction of capacitor C and the collector of transistor $Q_1$. The emitter of transistor $Q_2$, as shown in the embodiments of FIGURES 1 and 3, is grounded, while the direct current output is developed across the load resistance $R_L$ connected between the collector and a D.-C. voltage source (+V) (not shown).

Figure 2:
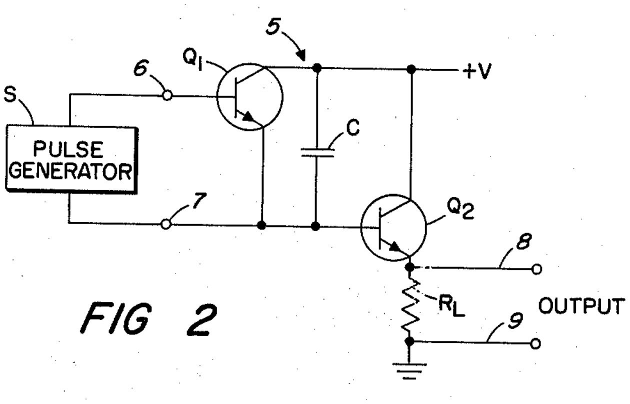
FIGURE 2 is a schematic presentation of a second embodiment of the detector circuit of this invention wherein the output load resistance is connected to the emitter of the second transistor.

In the embodiment of FIGURE 2, which may be identical to that of FIGURE 1 except for connection of the load resistance $R_L$, the collector of transistor $Q_2$ is directly connected to the positive D.-C. voltage source (not shown) and the direct current output is developed across the load resistance $R_L$ connected between the emitter and ground. In any case, the direct current signal is coupled from the detector circuit by means of leads 8 and 9.

In operation, if a series of pulses is coupled from generator S to detector circuit 5, this circuit will act as a rectifier, filter and D.-C. amplifier all at the same time. Transistor $Q_1$ is normally nonconductive and in the absence of an input signal to the detector circuit, capacitor C charges through transistor $Q_2$. When an input pulse is coupled to transistor $Q_1$, however, transistor $Q_1$ becomes conductive and discharges capacitor C, thus causing an increase in the base current of transistor $Q_2$. This increase in the base current of transistor $Q_2$ reduces the voltage on the collector of transistor $Q_2$. Thus, the base current for transistor $Q_2$ is supplied, not from the emitter of transistor $Q_1$, but from the capacitor C as the collector voltage rises linearly with time.

The load resistance $R_L$ may be connected either to the collector or the emitter of transistor $Q_2$, and D.-C. voltage will be developed responsive to the A.-C. input signal. The D.-C. voltage is then coupled from the circuit by means of output leads 8 and 9.

The embodiment shown in FIGURE 3 operates essentially as that of FIGURES 1 and 2. However, since the pulse generator is returned to ground instead of to the emitter of transistor $Q_1$, and extra voltage drop in series with the amplifier input is provided, and this assures that, if this embodiment of the invention is used in conjunction with any of the other two embodiments, it will be the last to be rendered conductive.

The detector circuit shown in the drawings (using 2N706 transistors, a 0.1 f. capacitor and a 1K ohm resistor) will switch approximately 50 milliamperes when supplied with a series of pulses of approximately three volt magnitude and 100 nanosecond duration. The ripple voltage produced across the load resistance will be of saw-tooth waveform with a peak-to-peak amplitude of approximately 0.5 volt using a pulse repetition rate of 5 kilocycles.

In view of the foregoing, it should be evident to those skilled in the art that the detector circuit of this invention provides an improved means for detecting small A.-C. signals and converting them to direct current output.

What is claimed as my invention is:

1. A detector circuit, comprising: first and second input terminal means adapted to receive an A.-C. signal to be detected; a first transistor having its base connected to said first input terminal means and its emitter connected with said second input terminal means; a capacitor one end of which is connected to the collector of said first transistor and the other end of which is connected to the emitter of said first transistor; a second transistor having its collector connected to said one end of said capacitor and its base connected to said other end of said capacitor; load means serially connected with the emitter and collector of said second transistor and a source of direct current supply voltage, and an output taken across said load means.

2. The detector circuit of claim 1 wherein said load means is connected between the collector of said second transistor and said source of direct current supply voltage.

3. The detector circuit of claim 1 wherein said load means is connected between the emitter of said second transistor and said source of direct current supply voltage.

4. A detector circuit comprising: first and second terminal means adapted to receive an A.-C. signal to be detected; a first transistor having its base connected to said first input terminal means, a capacitor one end of which is connected to the collector of said first transistor and the other end of which is connected to the emitter of said first transistor; a second transistor having its collector connected to said one end of said capacitor and its base connected to said other end of said capacitor;

the emitter of said second transistor being connected to said second input terminal means; load means serially connected with the emitter and collector of said second transistor and a source of direct current supply voltage; and an output taken across said load means.

References Cited by the Examiner

UNITED STATES PATENTS

| | | | |
|---|---|---|---|
| 2,913,597 | 11/59 | Rowe | 307—88.5 |
| 3,105,160 | 9/63 | Adler | 307—88.5 |

DAVID J. GALVIN, *Primary Examiner.*